(12) United States Patent
Moran

(10) Patent No.: US 7,807,923 B2
(45) Date of Patent: Oct. 5, 2010

(54) VANDAL RESISTANT PULL BOX

(75) Inventor: Thomas Moran, Vista, CA (US)

(73) Assignee: McCain, Inc., Vista, CA (US)

( * ) Notice: Subject to any disclaimer, the term of this patent is extended or adjusted under 35 U.S.C. 154(b) by 429 days.

(21) Appl. No.: 12/030,337

(22) Filed: Feb. 13, 2008

(65) Prior Publication Data

US 2009/0200056 A1  Aug. 13, 2009

(51) Int. Cl.
*H02G 3/08* (2006.01)

(52) U.S. Cl. .............................. 174/50; 174/58; 174/63; 70/57; 52/220.1

(58) Field of Classification Search .................. 174/50, 174/58, 63; 248/343, 906; 52/220.1; 70/57, 70/167, 232; 439/535
See application file for complete search history.

(56) References Cited

U.S. PATENT DOCUMENTS

| 4,777,812 | A | | 10/1988 | Haugen | |
|---|---|---|---|---|---|
| 5,047,599 | A | * | 9/1991 | Giolli | 200/43.22 |
| 5,197,307 | A | | 3/1993 | Abbott, Jr. | |
| 5,960,653 | A | * | 10/1999 | DeWalch et al. | 70/164 |
| 7,297,870 | B1 | * | 11/2007 | Sartini | 174/50 |
| 7,305,858 | B1 | * | 12/2007 | Wu et al. | 70/58 |
| 7,557,296 | B2 | * | 7/2009 | Lemke | 174/50 |

* cited by examiner

*Primary Examiner*—Dhiru R Patel
(74) *Attorney, Agent, or Firm*—The Maxham Firm

(57) ABSTRACT

A vandal resistant pull box to secure terminating utility cables and cable connections below ground surface. As a retrofit apparatus, brackets engage the bottom edges of the pull box container and a top cover securely engages the brackets. As a complete assembly, the container is included with the brackets and the cover. Any type of locking device may be employed to secure the cover to at least one of the brackets.

13 Claims, 3 Drawing Sheets

VANDAL RESISTANT PULL BOX

FIELD OF THE INVENTION

This invention relates generally to pull boxes for terminating utility cables such as power or signal wires, and more particularly to a pull box having a securely locked, vandal resistant cover to prevent unauthorized access to such wires.

DISCUSSION OF PRIOR ART

Pull boxes are located at various points in improved areas, typically where there are roads, usually paved, and buildings in the general vicinity. In cities they are located at or near most street intersections, as well as in other places.

Pull boxes are normally mounted in the ground, their top being flush with ground, street, or sidewalk level. Such pull boxes are spaced apart by appropriate distances and are "interconnected" by utility wires which lie within submerged conduits. Wires are connected within a pull box to other wires connected to other pull boxes or to distribution points, controllers, or other functional devices. Examples are traffic signal controllers, operational devices, water meter boxes, irrigation control boxes, communication circuits, telephone switching or distribution elements, and the like.

The basic function of pull boxes is to conceal the contents of the boxes, while making the contents (cable terminations and connections) accessible to authorized personnel.

Many instances have occurred where valuable copper wire has been stolen by vandals obtaining access to the inside of pull boxes and simply pulling out entire lengths of such utility wires or cables and entire cable harnesses. Not only is this costly, because of the greatly increased value of the copper, such loss of utility wires is dangerous because it can result in loss of signals, street lighting, and communications, possibly resulting in traffic delays and crashes, and injuries.

SUMMARY OF THE INVENTION

A purpose of the present invention is to reduce costs and safety compromises by making the contents of pull boxes more secure and to make them vandal resistant.

One embodiment of the invention provides a pull box with brackets secured to the bottom edges of the pull box, and a cover secured to the brackets thereby completely enclosing the contents of the pull box.

Another embodiment is addressed to currently installed pull boxes where the brackets and cover are retrofitted to such pull boxes to make them equally secure.

In an alternative embodiment, the cover can be provided with handle elements to facilitate lifting it off the pull box when a lock is removed.

BRIEF DESCRIPTION OF THE DRAWING

The objects, advantages, and features of the invention will be more readily understood from the following detailed description, when read in conjunction with the accompanying drawing, in which.

DETAILED DESCRIPTION OF THE PREFERRED EMBODIMENTS

Figure 1:
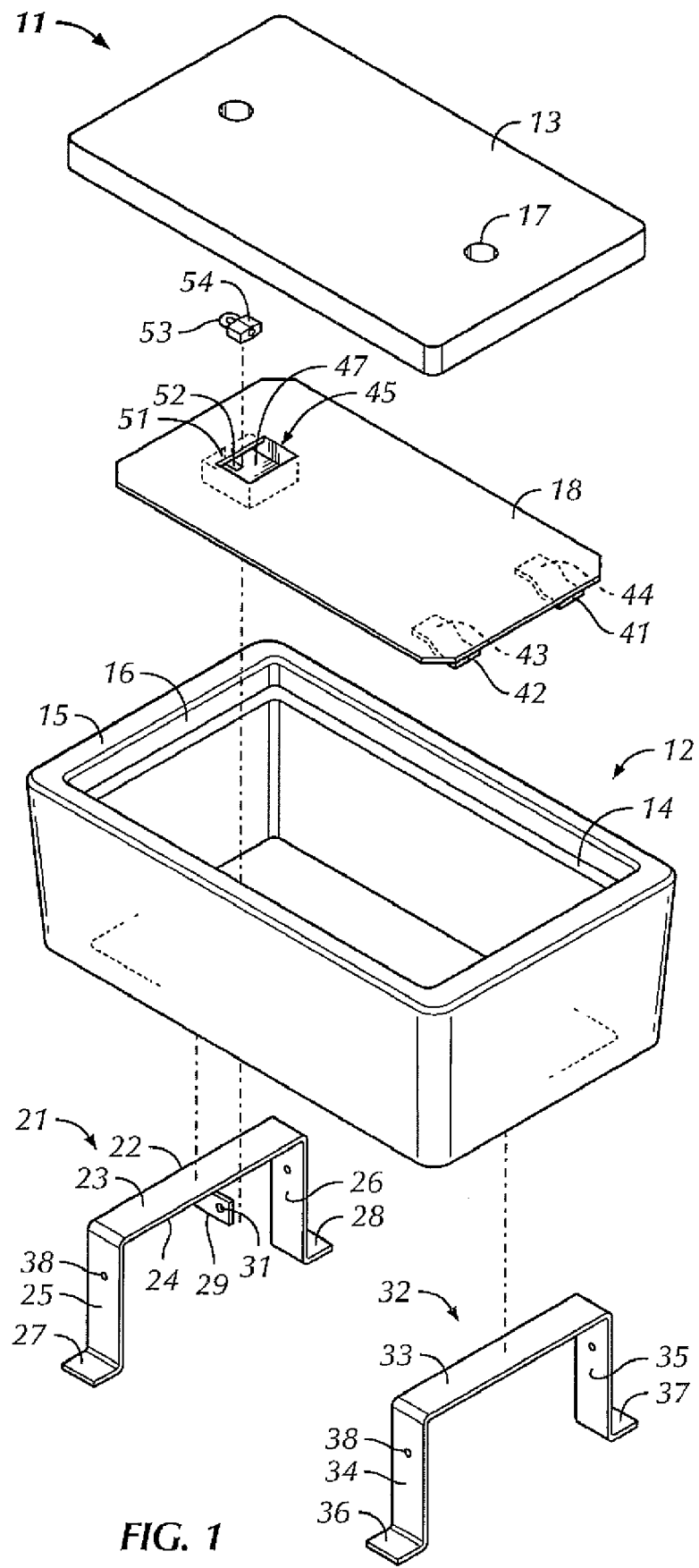
FIG. 1 is an exploded view, in perspective, of a pull box constructed in accordance with the invention.

With reference now to the drawing, and more particularly to FIG. 1, pull box 11 includes container 12, which is typically made of concrete or a composite, but it may be made of any relatively strong, corrosion resistant material. Cover 13, also made of concrete or a suitable composite, is shaped and configured to rest on ledge or shoulder 14 within and at or below top plane 15 of the container. Typically, the height of rim 16 between plane 15 and shoulder 14 is at least equal to the thickness of cover 13. The cover is typically formed with one or more holes 17 by which a conventional lifting tool may be inserted so the cover can conveniently be lifted off the pull box container.

The security structure of the pull box is comprised of security cover 18 which, in a preferred embodiment, rests on and is engaged with two mounting brackets 21, 32. First mounting bracket 21 has top, generally flat or horizontal section 22, having top surface 23 and bottom surface 24, and is formed with generally vertical legs 25, 26, and foot tabs 27, 28, respectively. Keeper tab 29, having hole 31 therethrough, is secured to bottom surface 24 of top section 22 by any appropriate means, such as welding. Keeper tab 29 projects away from top section 22 in a direction generally parallel with the top surface and is oriented generally perpendicular with that top surface. While keeper 29 is shown as a vertical bar with a hole therethrough, it could simply be a rod projecting in the same direction from surface 24 of top 22, and have a rigid rod or wire loop oriented downwardly therefrom. Such a rod and loop would function in the same way as keeper 29 and hole or opening 31.

Second mounting bracket 32 is formed essentially the same as bracket 21, but without keeper 29. It has top, generally flat or horizontal section 33, generally vertical legs 34, 35, with respective foot tabs 36, 37. It is normally prudent and necessary to arrange for electrically grounding the pull box structure and holes 38 can serve that purpose.

Cover 18 has Z-shaped brackets 41, 42 with portions 43, 44 secured to the underside of the cover by appropriate means such as welding. Brackets 41, 42 are configured to engage top section 33 of second bracket 32, which top section fits between the bottom surface of the cover and the top surfaces of Z-shaped brackets 41, 42. While two brackets 41, 42 are shown, a single such bracket, or more than two such brackets, could be employed. It is contemplated that cover 18 and brackets 21, 32 will be made of steel or equivalent, and these elements may be galvanized.

Figure 5:
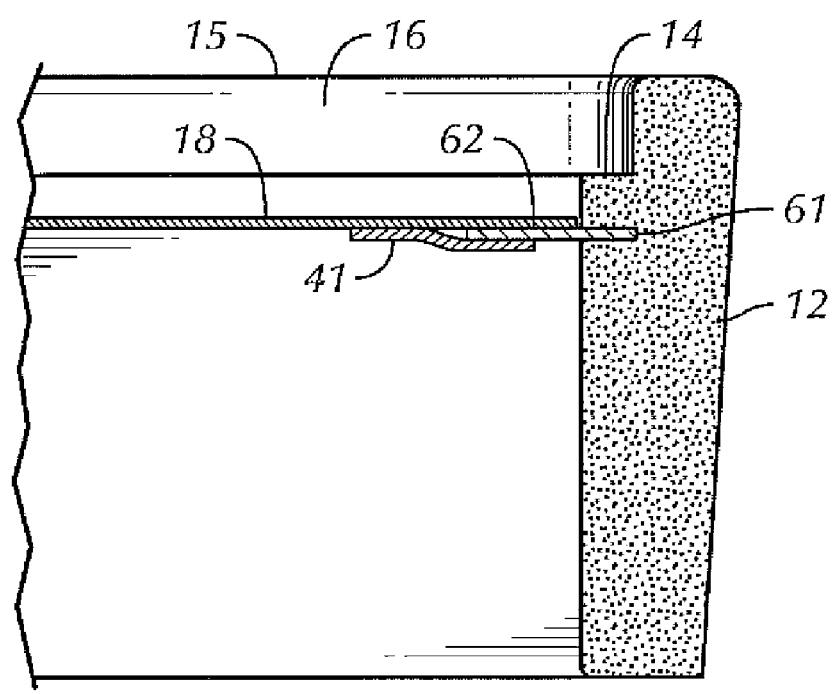
FIG. 5 is an enlarged partial sectional view of an alternative embodiment of the end of the pull box and cover opposite to the end shown in FIG. 4, taken along cutting plane 5-5 of FIG. 3.

An alternative embodiment is shown in FIG. 5, where mounting bracket 32 is replaced by bar or shelf 61. Rather than resting on top surface 33 of bracket 32, cover 18 rests on the top surface 62 of shelf 61 which projects into the interior of container 12. Z-shaped brackets 41, 42 (or one of such Z-shaped brackets), which are mounted to the underside of cover 18, engage shelf 61 as the cover is being assembled in container 12, as will be described in greater detail below.

Figure 3:
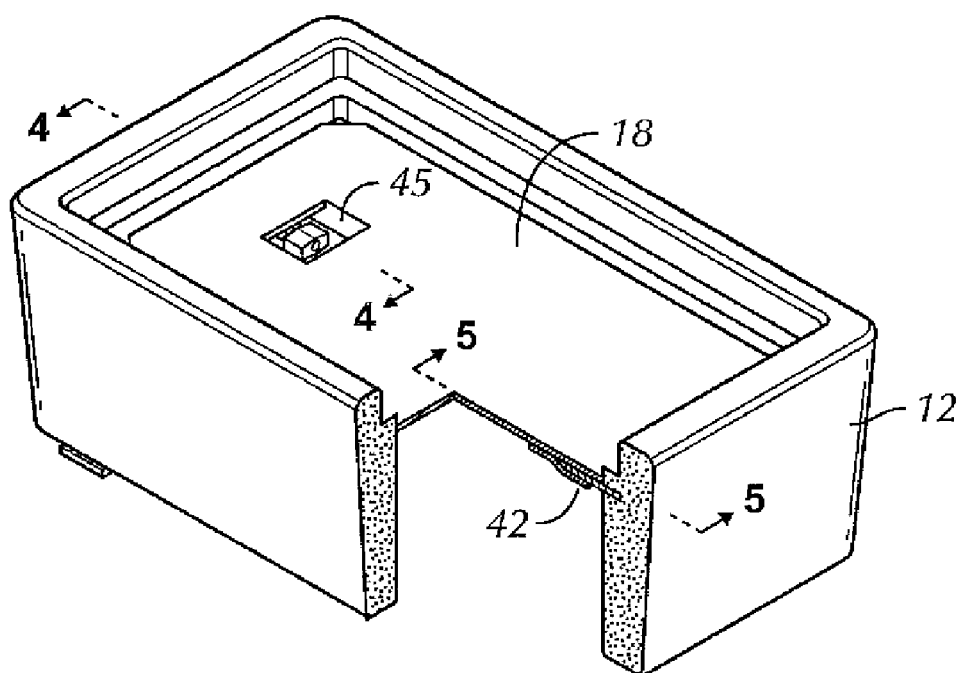
FIG. 3 is a perspective, partially cut away, view of the assembled pull box of FIG. 1.
Figure 4:
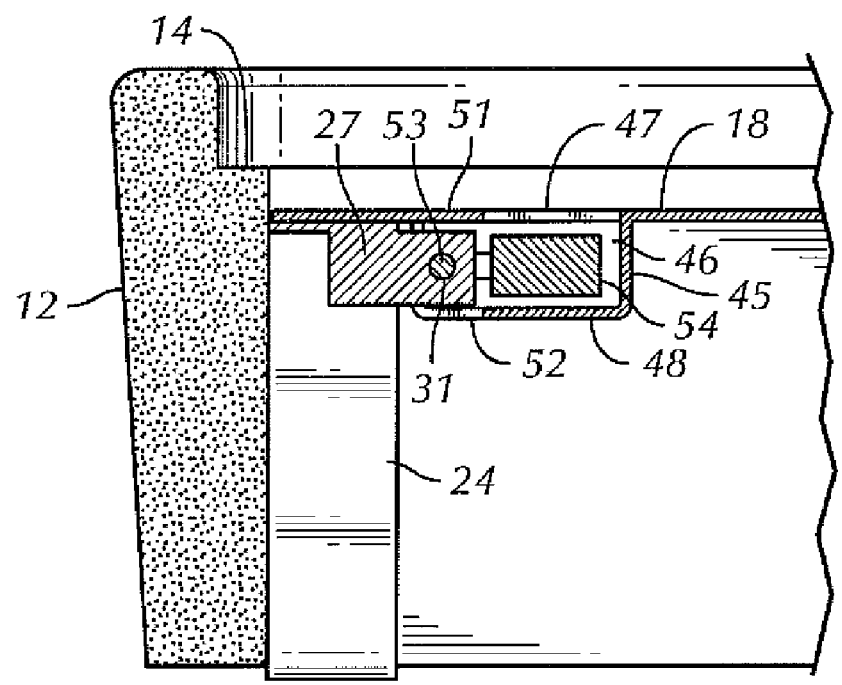
FIG. 4 is an enlarged partial sectional view taken along cutting plane 4-4 of FIG. 3.

The opposite end of cover 18 is fitted with lock box 45, the details of which are further evident from FIGS. 3 and 4. Lock box 45 extends below the plane of cover 18 and has a cavity 46 which is larger than opening 47 through the cover. This creates a shelf 51 portion of the cover which partially extends over cavity 46. After brackets 41, 42 are engaged with top section 33 of bracket 32, cover 18 is lowered to the horizontal position to rest on the top surfaces of bracket sections 22 and 33. In this position, tab 29 extends through slot 52 in lock box 45, making hole 31 accessible for the hasp 53 of a padlock 54. It can be seen in FIGS. 3 and 4 that hole 31 resides beneath shelf 51 so that hasp 53 is not readily accessible to damaging or destructive devices such as bolt cutters or hacksaws. Padlock 54 can be user supplied and can be either a combination type or a key type, or any other type of padlock that has a hasp and body that will fit this provided space. Other locking devices could be used to provide the necessary securing function.

As a further alternative to the bar-shaped keeper tab 29 with hole 31, the keeper could be hook-shaped where the opening, equivalent to hole 31, would be completed by bottom panel 48 of lock box 45. This configuration results in the same amount of security since the hasp of a lock cannot be removed from the keeper without opening the lock.

Shelf 51 has the dual functions of serving as a baffle, as described above, and acting as a handle to facilitate lifting of security cover 18 from brackets 21 and 32.

Figure 2:
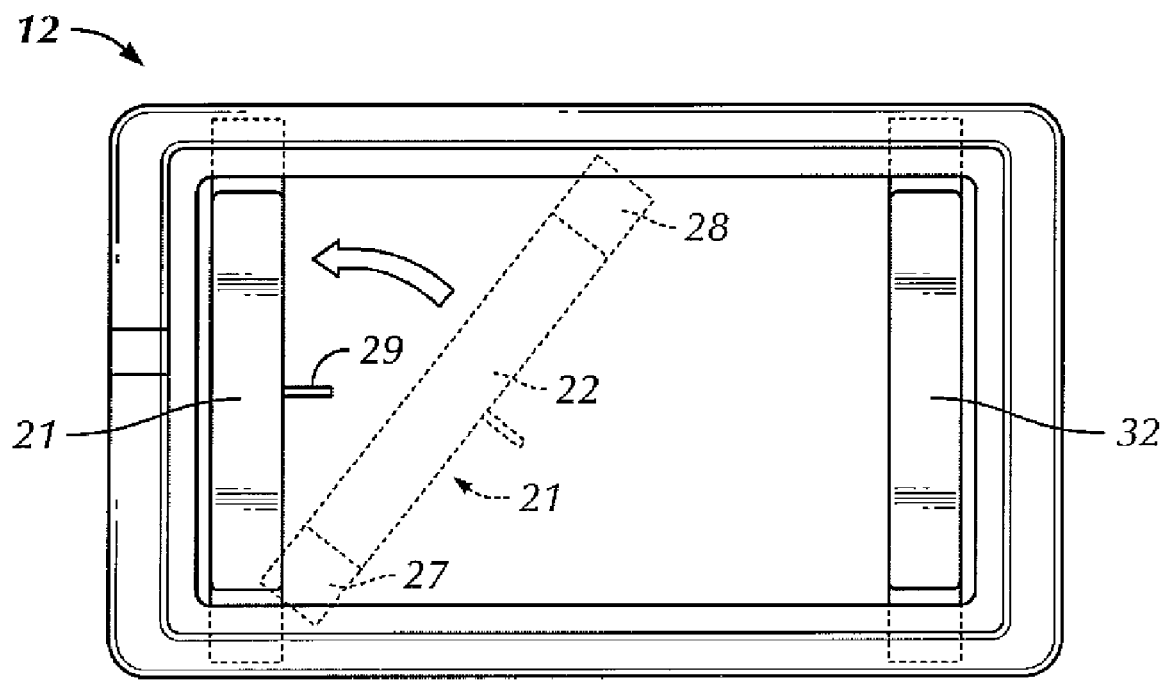
FIG. 2 is a top view of the assembled pull box of FIG. 1 without the cover, showing a bracket in partially installed position in dotted lines.

With reference to FIG. 2 it is seen how the system of the invention can be applied to existing pull boxes to provide the desired level of security. With conventional container 12 already in the ground, a shallow space is hollowed out under the edges of the container. Bracket 21 is placed within the container at an angle as shown in dotted lines. Foot tabs 27, 28 are then slid under the bottom edges of container 12 as bracket 21 is rotated into final position, represented by solid lines in FIG. 2. Second bracket 32 is installed in a similar manner. With the foot tabs confined under the edges of the container, cover 18 is installed as previously described. Once padlock 54 is secured to keeper 29, the entire pull box is a secure unit and it would have to be removed from the ground to gain access to its contents without removing the cover. Ground level cover 13 is then placed in the top of container 12, resting on ledge 14. Retrofitting existing pull boxes can easily be accomplished in a matter of minutes, normally without special tools or even any tools at all.

It is contemplated that the end users of such pull boxes will provide their own padlocks 54 from their own stock of locks, so no special keys, nor distribution of such keys throughout the user's system, will be required.

An alternative embodiment would provide the same functions but without second mounting bracket 32 or Z-shaped brackets 41, 42. A single mounting bracket 21 would be placed in the general vicinity of the middle of the container in the manner described above, and lock box 45 would be formed in the center of security cover 18. Baffle 51 provides the same two functions as before. In this embodiment, security cover 18 is larger and it rests on ledge 14. Mounting bracket 21 would have relatively longer legs so that top surface 23 lies in the same plane as ledge 14. Thus, cover 18 rests on ledge 14 and top section 22 of bracket 21.

The pull box could be otherwise constructed with the same dimensions as previously shown and described, and would include cover 13. Alternatively, rim 16 could be made shorter and security cover 18 could be the exposed top cover of the pull box. There would be no cover 13 in that case.

In new installations, pull boxes in accordance with the invention may be provided in standard sizes or in custom sizes.

In view of the disclosure herein, it is likely that modifications and improvements will occur to those skilled in this field of endeavor which are within the scope of the invention. The invention is to be interpreted and limited only by the appended claims and reasonable equivalents thereof.

What is claimed is:

1. A pull box for terminating electrical wires, the pull box having a box-shaped container having an interior and comprising:
    at least one mounting bracket within said container, said mounting bracket having two ends and having one tab on each of said two ends configured to engage bottom edges of said container; a keeper tab mounted to said at least one mounting bracket, said keeper tab being formed with an opening therethrough to receive a shackle of a locking device; and a security cover having a top surface and an underside and being configured to engage said keeper tab in such a manner that said opening in said keeper tab is externally accessible when said cover is in place in said container, the interior of said container, said at least one mounting bracket, and said keeper tab are below said top surface of said security cover.

2. The pull box recited in claim 1, wherein said at least one mounting bracket comprises first and second spaced mounting brackets, one of said mounting brackets having said keeper tap mounted thereto.

3. The pull box recited in claim 2, and further comprising at least one bracket on said security cover shaped and configured to engage one of said first and second mounting brackets.

4. The pull box recited in claim 3, wherein said at least one bracket comprises two spaced said brackets mounted on the underside of said security cover.

5. The pull box recited in claim 2, wherein said first and second mounting brackets are both formed with a top, generally horizontal portion and opposite downwardly extending legs, said tabs being formed at the bottom of said legs and extending outwardly therefrom.

6. The pull box recited in claim 5, wherein said keeper tab extends generally laterally from said generally horizontal portion.

7. The pull box recited in claim 1, wherein said security cover has an opening therethrough and has a lock box mounted to said underside, said lock box having a top opening and a slot in one side through which said keeper tab protrudes, said opening through said security cover being in alignment with and smaller than the opening in the top of said lock box, thereby forming a baffle over said keeper tab and over said opening in said keeper tab.

8. The pull box recited in claim 1, wherein said at least one mounting bracket is formed with a top, generally horizontal portion and opposite downwardly extending legs, said tabs being formed at the bottom of said legs and extending outwardly therefrom.

9. The pull box recited in claim 8, wherein said keeper tab extends generally laterally from said generally horizontal portion.

10. A method for securing an interior of a the container of a pull box from unauthorized access through an open top thereof, the method comprising:
    inserting at least one mounting bracket into the container through the open top thereof at an angle with respect to a plane of a plurality of walls of the container, the mounting bracket having outwardly extending tabs shaped and configured to engage bottom edges of the container, the at least one mounting bracket having a keeper tab secured thereto, the keeper tab being formed with a hole therethrough;
    rotating the at least one mounting bracket to a position parallel with one of the walls of the container with the outwardly extending tabs extending under and engaging the bottom edges of two opposite walls of the container;

placing a security cover on a top of the at least one mounting bracket, the security cover having a lock box on the underside thereof, the lock box being shaped and configured with a slot to receive the keeper tab; and securing the cover to the at least one mounting bracket by engaging the hole through the keeper tab with a locking device, thereby securing the interior of the container.

11. The method recited in claim 10, wherein said at least one mounting bracket comprises first and second mounting brackets, the method further comprising inserting the second mounting bracket into the container through the open top thereof at an angle with respect to the plane of the walls of the container, the second mounting bracket having outwardly extending tabs shaped and configured to engage the bottom edges of the container;

rotating the second mounting bracket to a position parallel with one of the walls of the container with the outwardly extending tabs of the second mounting bracket extending under and engaging the bottom edges of two opposite walls of the container, the first and second mounting brackets being spaced apart within the container; and placing the security cover onto the top of the first and second mounting brackets.

12. The pull box recited in claim 11, wherein the security cover is formed with at least one bracket on the underside thereof, the method further comprising engaging a top of said second mounting bracket between the underside of the cover and the at least one bracket.

13. The method recited in claim 10, and comprising the further step of removing material from beneath the bottom edges of the container to enable the outwardly extending tabs of the mounting bracket to be positioned beneath the bottom edges of the container.

* * * * *